United States Patent [19]

Ford

[11] Patent Number: 4,884,683
[45] Date of Patent: Dec. 5, 1989

[54] BOTTLE CARRIER

[76] Inventor: Thomas E. Ford, Cederwood Blvd., D-59, Baldwinsville, N.Y. 13027

[21] Appl. No.: 336,798

[22] Filed: Apr. 12, 1989

[51] Int. Cl.$^4$ ............................................. B65D 21/02
[52] U.S. Cl. .................................. 206/163; 206/512; 206/821; 220/21; 220/96; 220/DIG. 15
[58] Field of Search ................. 211/74, 59.4; 312/244; 217/19; 220/21, 96, DIG. 15; 206/512, 511, 821, 94 R, 96, 203, 163, 561, 162

[56] References Cited

U.S. PATENT DOCUMENTS

| 526,309 | 9/1894 | Goerger | 217/19 |
| 1,957,153 | 5/1934 | Smiley, Jr. | 206/821 X |
| 3,251,638 | 5/1966 | Schwartz | 312/244 |
| 3,992,069 | 11/1976 | Kitterman | 312/244 |

Primary Examiner—William Price
Attorney, Agent, or Firm—Charles S. McGuire

[57] ABSTRACT

A bottle tote for temporary storage and transport of empty beverage containers includes a planar base with four upright members extending fixedly therefrom to free ends lying in a common plane. The upright members support a plurality of track structures, each adapted to receive an open-topped tray having dividers for holding the containers. A foldable and adjustable handle structure is attached to the uppermost track, and a plurality of rod-like members are selectively engageable with the free ends of the upright members to permit vertical stacking of two totes of the same design.

9 Claims, 1 Drawing Sheet

U.S. Patent
Dec. 5, 1989
4,884,683
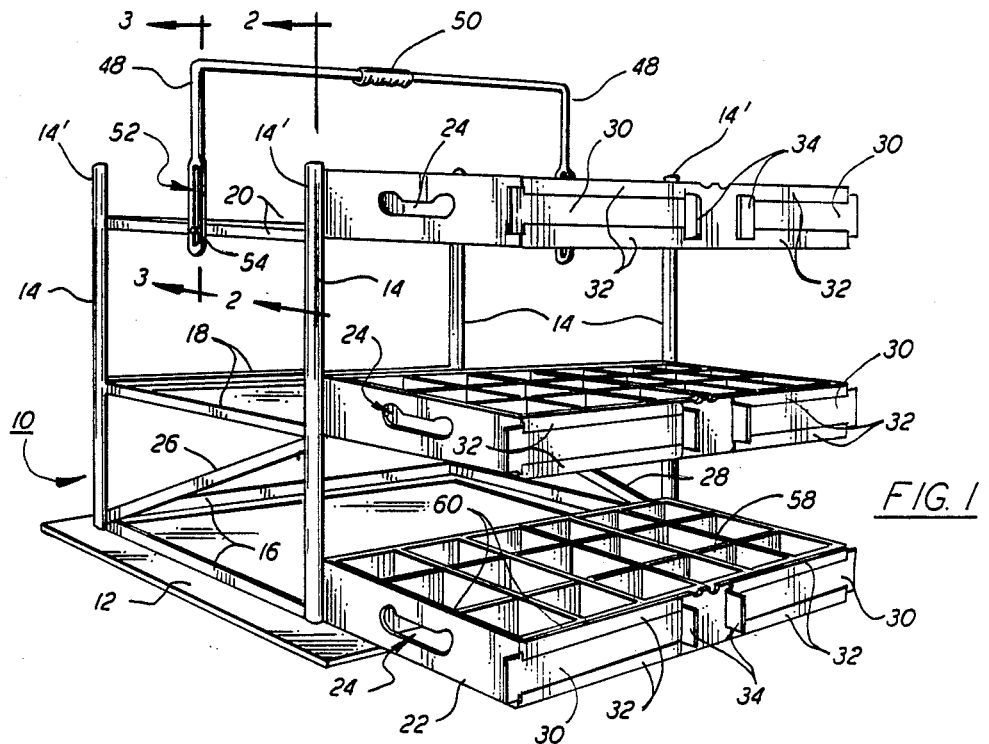
FIG. 1
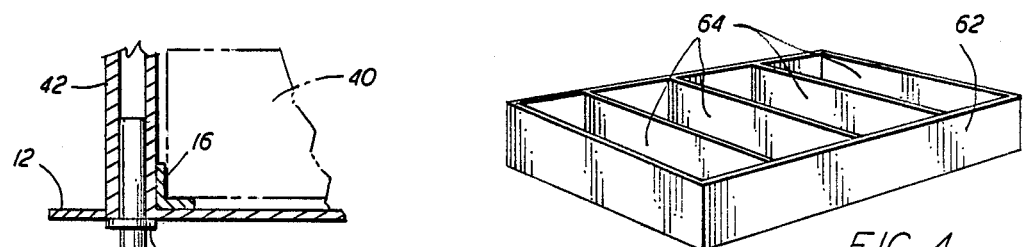
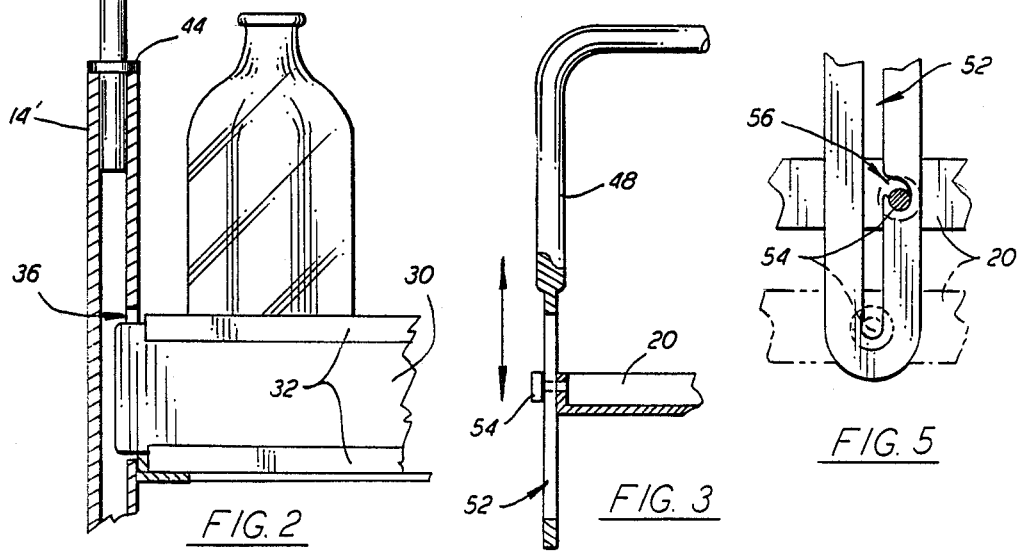
FIG. 2
FIG. 4
FIG. 3
FIG. 5

BOTTLE CARRIER

BACKGROUND OF THE INVENTION

The present invention relates to structure for holding and carrying containers such as bottles and cans, and more specifically is intended as a convenient means for storing and transporting empty beverage containers.

In recent years, an increasing number of states have enacted so-called "bottle laws" requiring a deposit to be paid at the time of purchase for glass, plastic and metal containers for soft drinks, beer, and the like. The deposit is refunded when the empty containers are retuned to the point of purchase or other redemption location for recycling. This means, of course, that the consumer must store the empty cans and bottles until they are returned, and collect them in some manner for transport to the return location.

The use of paper bags or cardboard boxes is generally unsuitable since they quickly become saturated with the liquid residue in the cans or bottles, and break or simply come apart. Other forms of bottle totes have been proposed but have not achieved wide commercial acceptance for one or more reasons, such as cost, weight, inconvenient to lift or carry (bulky or cumbersome), of fixed size which may provide either inadequate or excessive capacity, etc.

Accordingly, it is a principal object of the present invention to provide a structural combination for temporary storage and transport of cans, bottles or other such containers, particularly when empty, which is convenient and durable in use, relatively inexpensive to manufacture, light in weight, adjustable in capacity, and attractive in appearance.

A further object is to provide an empty container tote having a base structure designed to accommodate a particular number of removable container-holding trays, with means for vertically stacking thereon an additional tote of like design.

An additional object is to provide a bottle tote having a sturdy base and an easily adjustable and foldable handle for convenient carrying at different heights.

Other objects will in part be obvious and will in part appear hereinafter.

SUMMARY OF THE INVENTION

In accordance with the foregoing objects, the invention contemplates a bottle tote including a rack having a base with upright members supporting a plurality of tracks at various heights above the base. The tote further includes a plurality of trays which may be placed on the tracks, and removable inserts which may be placed in the trays to accept bottles or cans of various sizes. In the preferred embodiment, detent or catch means are provided for releasably holding the trays in position on the tracks.

A carrying handle is mounted upon the rack by rivets or other such means permitting pivoted movement between folded and carrying positions. A series of slot permits selective placement of the handle in any one of a plurality of adjustable positions with respect to the rack, changing the height of the manually engageable portion of the handle above the rack. A further desired feature is the provision of hollow, upright members on the rack for accepting telescoping support members adapted to temporarily support an additional tote of like design.

The foregoing and other features of construction and cooperative relationships of the various components will be more readily understood and appreciated from the following detailed description, taken in connection with the accompanying drawing.

BRIEF DESCRIPTION OF THE DRAWING

FIG. 1 is a perspective view of the bottle tote of the invention, shown in a preferred embodiment;

FIG. 2 is a fragmentary, elevational view, in section on the line 2—2 of FIG. 1 and further showing additional elements;

FIG. 3 is a fragmentary, elevational view, in section on the line 3—3 of FIG. 1;

FIG. 4 is a perspective view of an alternate form of insert which may be used in place of the inserts shown in FIG. 1; and FIG. 5 is an enlarged fragmentary view showing further preferred details of the handle structure, shown in alternate positions.

DETAILED DESCRIPTION

Referring now to the drawing, in FIG. 1 is shown a preferred embodiment of the bottle tote of the present invention, denoted generally by reference numeral 10. It will be understood, of course, that the general designation "bottle tote" is intended to apply to a combination of elements for the temporary storage and transport of bottles, cans and other such containers, particularly empty beverage containers. Bottle tote 10 includes a rack having a planar base 12 for resting upon a horizontal support surface, with four upright members 14 extending fixedly therefrom. Members 14 support a plurality of tracks at various heights along each side and the rear of tote 10. In the disclosed embodiment, three such track structures are shown, the lower, middle and upper tracks being denoted by reference numerals 16, 18 and 20, respectively.

Middle and upper tracks 18 and 20 each comprise a pair of L-shaped wall members extending along each side of the rack between the front and rear upright members 14, and a third L-shaped member extending between the two rear upright members. Lower track 16 need include only the upright portions of the wall members since base 12 may provide the function of the horizontal portions of the middle and upper L-shaped walls. Portions 14' of each of members 14 extend upwardly, above upper tracks 20; members 14 are in the form of cylindrical rods, hollow along their entire length, with open upper and lower ends, for purposes described later.

Trays 22 are removably received in each of tracks 16, 18 and 20. In the disclosed embodiment, trays 22 are of identical construction, each having a front and rear wall, two side walls, a bottom wall and an open top. The end walls each include a horizontally elongated opening 24, the openings in one end of each tray being seen in FIG. 1, for individually lifting trays 22 when they are removed from the tracks of the rack structure. The length and width of trays 22 is such that they may pass between the front upright members 14 and rest upon the horizontal portions of tracks 18 and 20, or upon base 12, being constrained at the sides and rear by the upright portions of the tracks. For added stability, braces 26 and 28 may be provided, extending fixedly between the front and rear upright members 14 on each side, preferably extending angularly in opposite directions, as shown in FIG. 1.

Trays 22 preferably include means for releasable, interlocking engagement with the rack structure to prevent the trays from unintentionally sliding out of their respective tracks, once placed therein, in the event the rack is tipped forwardly. Although simpler structure, e.g., resilient detent means, may be provided, the interlocking feature is provided in the illustrated embodiment by a pair of panel members 30, reciprocally slidable in upper and lower channels 32 on the front wall of trays 22. Outwardly extending tabs 34 on each of panel members 30 may be manually manipulated to slide panel members 30 toward or away from one another. In order to insert trays 22 into the tracks, panel members 30 are moved inwardly, toward one another, so that the panel members may be positioned between the two front, upright members 14. When the tray is fully inserted, panel members 30 are laterally aligned with open slots 36, one of which may be seen in FIG. 2, in both front upright members 14. Panel members 30 may then be moved outwardly, under spring bias (not shown), if desired, to engage the outer end portions thereof in slots 36, thereby releasably locking the trays in place on the rack.

As an optional, but preferred, accessory, extension rods 38 are provided to permit vertical stacking of the disclosed totes upon one another, as shown in FIG. 2. The lower end of rod 38 is inserted into the upper end of portion 14' of upright member 14, one of rods 38 bing inserted into all four of portions 14'. Another of the totes may then be placed above the first by receiving the upper ends of rods 38 in the open, lower ends of the upright members of the upper tote, one such member being shown in FIG. 2 indicated by reference number 42. The extent of movement of rods 38 into members 14 and 42 is limited by fixed collars 44 and 46, respectively, on rods 38.

A carrying handle of generally U-shape, having side portions 48 and a medial portion preferably having a centrally disposed, molded hand grip 50, is shown in FIGS. 1 and 3. Each of side portions 48 includes a flat portion including elongated, through slot 52. Rivets 54 (one of which is seen in FIGS. 1 and 3) extend loosely through slots 52 in each of side portions 48 of the handle structure and are secured on opposite sides of upper track 20. The handle may be moved upon rivets 54 between the illustrated upright position, for lifting and carrying tote 10, and a folded position, slid downwardly until the top end of slots 52 meet rivets 54 and then either pivoted about rivets 54 and laid against track 20 or extending across a tray positioned thereon. Also, as shown in FIG. 5, one or more curved or angled portions 56 are preferably provided along one side of each of slots 52 and communicating therewith. Rivets 54 may thus be placed in a pair of slot portions 56 (one in each of slots 52) to place handle grip 50 different distances from base 12, thereby making lifting and carrying of the tote by persons of different heights more convenient.

In FIG. 1, trays 22 are shown with "egg crate" type dividers 58 removably placed therein, preferably positionally stabilized by having end portions of the dividers positioned in slots 60 extending into the inner surface of the front, rear and side walls of trays 22. Dividers 58 are dimensioned so that the individual compartments defined thereby will hold bottles or cans up to about 4" in diameter which normally would include all those of capacity up to 16 fluid ounces, as well as many one-liter containers. Dividers 58 may be removed from one or more of trays 22 and replaced by dividers such as that shown in FIG. 4, denoted by reference numeral 62. Dividers 62 have a length and width suitable for insertion in trays 22 to provide a plurality of openings 64 dimensioned to accept larger containers, e.g., 2 liter bottles or jugs.

From the foregoing, it will be seen that the objects and advantages of the invention are effectively and efficiently achieved in the disclosed bottle tote. The rack portion, including the base, upright members and tracks are preferably formed of rigid, high-strength plastics which may be assembled by heat fusion of those parts which are fixedly attached to one another. The trays and handles may be formed as one-piece plastic moldings, the latter being secured by rivets to the upper track structure in the manner indicated. The stacking accessory and the tray-rack interlock means provide useful and practical options, permitting vertical stacking of two totes of the same design, and guarding against unintentional dislodgement of the trays, particularly as they are being carried or otherwise transported while full of empty containers. Providing a solid, rectangular base of somewhat larger length and width than the trays and their supporting structure adds both structural rigidity and stability, decreasing the chances of accidentally tipping the tote over when it is resting on a horizontal surface. The folding, pivoting and height adjustment features of the handle structure provide additional convenient features, as do the alternate dividers or tray inserts. The tote may be constructed with the required strength and durability, while still being light enough for carrying by most persons, even when filled with a relatively large number of empty containers.

What is claimed is:

1. A bottle tote for temporary storage and transport of empty containers comprising, in combination:
    (a) a flat rectangular base, of predetermined length and width;
    (b) two front and two rear, upright members, each fixedly attached at one end to said base at spaced points thereon defining a rectangle of lesser length and width than said predetermined length and width, and extnding perpendicularly from said base to free ends lying in a common plane parallel to said base;
    (c) at least two track structures fixedly supported upon said upright members at different distances from and parallel to said base, each of said track structures including members extending between said front and rear upright members on each side and between said two rear upright members with the space between said front upright members unobstructed;
    (d) at least two trays, each having front, rear, side and bottom walls and an open top, said trays having a length and width dimensioned to fit between said upright members and removably rest upon said track structures by insertion and removal through said unobstructed space between said front upright members; and
    (e) a handle structure affixed to the uppermost of said track structures for lifting and carrying said tote.

2. The invention according to claim 1 and further including divider structure within each of said trays and dividing the latter into separate compartments, each adapted to enclose the lower portion of one of said empty containers.

3. The invention according to claim 2 and further including a pair of said divider structures for alternate, removable placement in either of said trays, said pair of divider structures defining separate compartments of different sizes to enclose different sizes of containers.

4. The invention according to claim 1 wherein said handle structure comprises an essentially U-shaped member having side portions pivotally connected to the uppermost of said track structures.

5. The invention according to claim 4 wherein said handle structure is connected to said uppermost track structure by rivets passing through elongated slots in said side portions, permitting both pivotal and sliding movement of said handle structure with respect to said rivets.

6. The invention according to claim 5 wherein said side portions each include at least one slotted portion along one side of and communicating with said elongated slots, whereby said rivets may be placed in said slotted portions to selectively adjust the height of said handle structure.

7. The invention according to claim 1 and further including stacking means releasably engageable with said free ends of said upright members to support an additional tote above said upright members.

8. The invention according to claim 7 wherein said stacking means comprise four rod-like members each releasably engaged at one end with one of said free ends of said upright members, and at the other end with lower portions of said additional tote.

9. The invention according to claim 8 wherein said upright members are hollow throughout their length and open at both ends, and said rod-like members are telescopingly engaged with said open ends of said upright members of said tote and said additional tote.

* * * * *